United States Patent [19]

Stella

[11] Patent Number: 4,770,208

[45] Date of Patent: Sep. 13, 1988

[54] WATER MIXER TAP, OF THE SINGLE-LEVER TYPE

[75] Inventor: Pietro Stella, Novara, Italy

[73] Assignee: Rubinetteria Stella S.p.A., Milan, Italy

[21] Appl. No.: 70,754

[22] Filed: Jul. 6, 1987

[30] Foreign Application Priority Data

Jul. 31, 1986 [IT]  Italy .................. 21354 A/86

[51] Int. Cl.⁴ ......................................... F16K 11/074
[52] U.S. Cl. .............................. 137/625.17; 137/625.4; 251/208
[58] Field of Search ........... 137/625.17, 625.4, 625.41, 137/454.6; 251/208, 209

[56] References Cited

U.S. PATENT DOCUMENTS

| | | | |
|---|---|---|---|
| 3,680,592 | 8/1972 | Hayman | 137/625.4 |
| 4,205,822 | 6/1980 | Bernat | 251/208 |
| 4,325,403 | 4/1982 | Uhlmann | 137/625.17 X |
| 4,362,186 | 12/1982 | Parkison et al. | 137/625.17 |
| 4,502,507 | 3/1985 | Hayman | 137/625.4 |
| 4,610,268 | 9/1986 | Knapp | 137/625.17 X |

*Primary Examiner*—John Rivell
*Attorney, Agent, or Firm*—Guido Modiano; Albert Josif

[57] ABSTRACT

The water mixer tap comprises a body defining a dispenser chamber connected to a dispenser conduit. A movable shutter disc is provided in the mixing chamber, and is operable by means of an external lever and acts on two seats, respectively communicating to a hot water inlet conduit and to a cold water inlet conduit. The movable disc defines at least one seat control port which leads into the mixing chamber. The peculiarity of the invention resides in the fact that the control port defines useful flow sections for the water which are variable along planes substantially perpendicular to the plane of contact between the seats and said movable shutter disc.

13 Claims, 3 Drawing Sheets

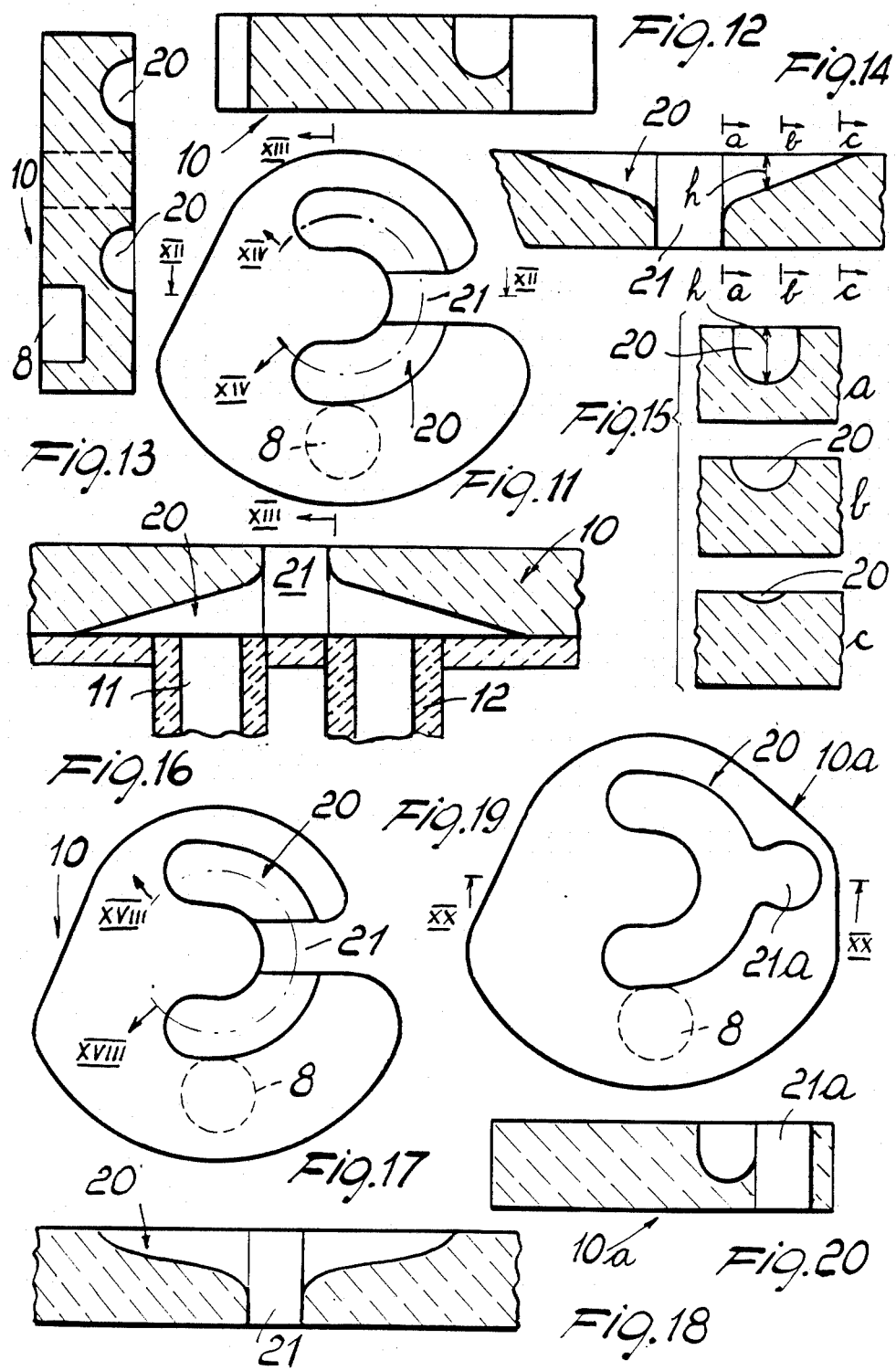

WATER MIXER TAP, OF THE SINGLE-LEVER TYPE

BACKGROUND OF THE INVENTION

The present invention relates to a water mixer tap of the single-lever type.

As known, mechanical mixers of hot and cold water, commonly known as single-lever mixer taps, wherein a single control element allows to alter both the water mixing temperature and the flow rate of the water dispensed, have been available on the market for some time. Such types of taps have, as a sealing and adjustment element, a ceramic disc whereon act two seats, respectively for hot water and for cold water, which rest on the ceramic disc which can rotate and translate and is provided with one or more ports for the flow of water towards the dispenser.

Such kinds of taps, which are for example described in the U.S. Pat. No. 3,882,897 and in the French Pat. No. 2,208,499, have the advantage of having very small friction surfaces, determined by the region of contact between the seats and the movable disc, with a consequently very smooth operation of the control element and the impossibility of subjecting the control elements and other parts of the tap to excessive and dangerous forces and stresses which depend on the pressures of the water supply.

On the other hand such mixers do not always offer satisfactory possibilities of fine temperature adjustment, since, for manufacture reasons, the seats unavoidably have a circular port and the ports provided on the movable disc, even if variously shaped, are not capable of allowing a variation of the mixing temperature which is proportional to the rotational movement of the operating lever which is performed to vary the mixing temperature.

Other types of known single-lever mixer taps are provided, as sealing element, with the coupling of two ceramic discs having variously shaped water flow ports, mutually mating and precompressed, with the advantage of allowing a fine adjustment of the variation of the mixing temperature, by virtue of the possibility of providing the ports, on both discs, with a shaped configuration, but on the other hand they have a very wide contact surface which creates friction problems upon operation, said discs also being subject to even considerable calcareous deposition, to pressure shocks, that is to the so-called water hammering, to deformations caused by the temperature and by the water hammering, to the friction between the two discs caused by the necessary initial compression for assembly, with the possibility of reaching the mutual jamming of the two discs, in the more severe cases, with the impossibility of operating the control element.

SUMMARY OF THE INVENTION

The aim proposed by the invention is indeed to eliminate the above described problems by providing a water mixer tap of th single-lever type which avails itself of the advantages described in both types of the above mentioned types of taps, without however having their related disadvantages.

Within the scope of the above described aim, a particular object of the invention is to provide a mixer tap which allows to have a very fine adjustment of the mixing temperature with a temperature variation proportional, at least within a preset range, to the angular movement of the control lever.

Still another object of the present invention is to provide a mixer tap wherein there is the possibility to adjust as desired the flow rate of the mixed water, keeping its temperature constant.

A further object of the present invention is to provide a mixer tap which besides featuring improved structural characteristics, is capable of giving the greatest assurances of reliability and safety in use.

Yet another object of the present invention is to provide a mixer tap which is easily manufacturable from elements and materials which are easy to obtain, and which is furthermore competitive from a merely economical point of view.

The above described aim, the objects mentioned and others which will become apparent hereinafter, are achieved by a water mixer tap, of the single-lever type, comprising a body defining a dispenser chamber connected to a dispenser oulet, in said chamber there being provided a movable shutter disc, operable by means of an external lever and acting on two seats, respectively communicating with a hot water inlet conduit and to a cold water inlet conduit, said movable disc defining at least one control port for said seats which leads into said chamber, characterized in that said at least one control port defines useful flow sections for the water which are variable along planes substantially perpendicular to the plane of contact between said seats and said movable shutter disc.

BRIEF DESCRIPTION OF THE DRAWINGS

Further features and advantages will become apparent from the description of a preferred, but not exclusive, embodiment of a water mixer tap of the single-lever type, illustrated only by way of non-limitative example in the accompanying drawings, where:

FIG. 11 is a view of the shutter disc from the side provided with the control port;

FIG. 12 is a cross section view along the line XII—XII of FIG. 11;

FIG. 13 is a cross section view along the line XIII—XIII of FIG. 11;

FIG. 14 is a rectilinear development view of the cross section along the curve XIV—XIV of FIG. 11;

FIG. 15 is a view of the cross sections respectively along the lines a—a, b—b, c—c of FIG. 14;

FIG. 16 is a detail view of the seats applied to the shutter disc illustrating the conveyor counterdisc;

FIG. 17 is a view of the shutter disc from the side of the control port with a shaped cross section;

FIG. 18 is a cross section view, developed on a plane, taken along the curve XVIII—XVIII of FIG. 17;

FIG. 19 is a view of a variated embodiment of the shutter disc shaped to perform the discharge of water in an axial direction;

FIG. 20 is a cross section view along the line XX—XX of FIG. 19.

DESCRIPTION OF THE PREFERRED EMBODIMENTS

Figure 2:
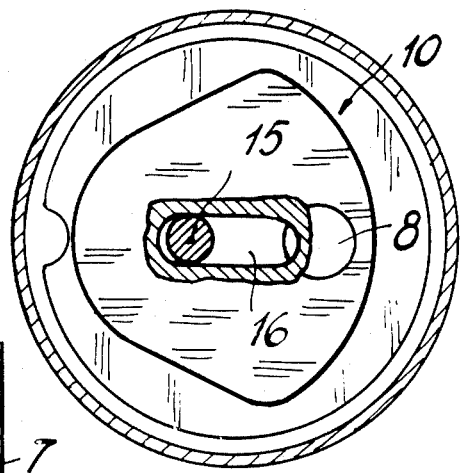
FIG. 2 is a cross section view along the line II—II of FIG. 1, with the shutter disc in a closing position.

With reference to the above described figures, the water mixer tap of the single-lever type, with means for the fine adjustment of the mixing temperature, according to the invention, comprises a cartridge, generally indicated by the reference numeral 1, which is insertable in the outer body of the tap and defines in its interior a mixing or dispenser chamber 2 provided with openings 3 which connect it to the dispenser outlet which may have any shape.

An operating lever 4, accessible from outside, is associated with the cartridge 1, and is connected, by means of the pivot 5 and with the possibility of oscillating about a substantially horizontal axis of the pivot 5, to a supporting disc 6 accommodated inside the cartridge 1 and rigidly associated therewith. In turn the pivot 5 can oscillate about a substantially vertical axis (FIG. 1) by virtue of the presence of a groove extending along an arc of a circumference in the upper portion of the support 6 and accommodating the ends of the pivot 5.

The rotation of the lever 4 about the pivot 5 causes the variation of the flow rate of the dispensed water, while the rotation of the pivot 5 in the supporting plate 6 causes, in a per se known manner, the variation of the mixing.

Figure 1:
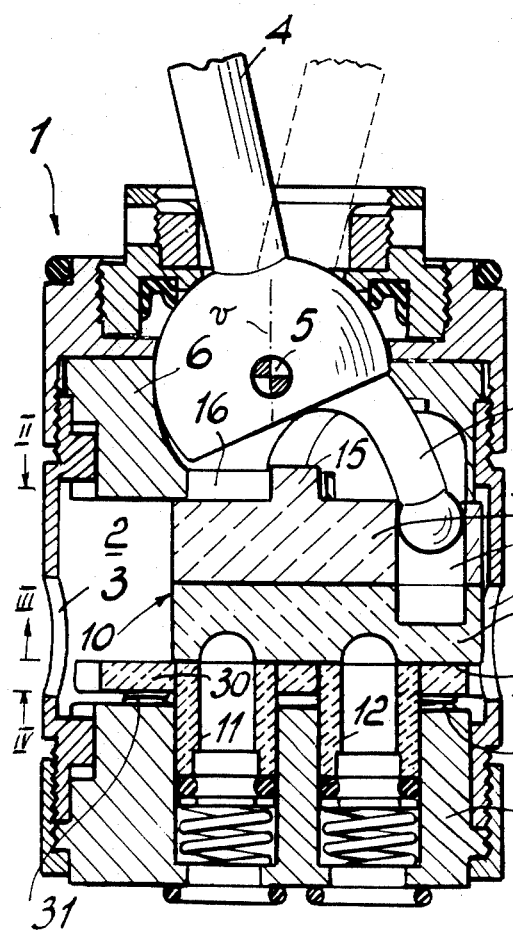
FIG. 1 is a view of the body of the mixer tap in cross section along a vertical plane.
Figure 3:
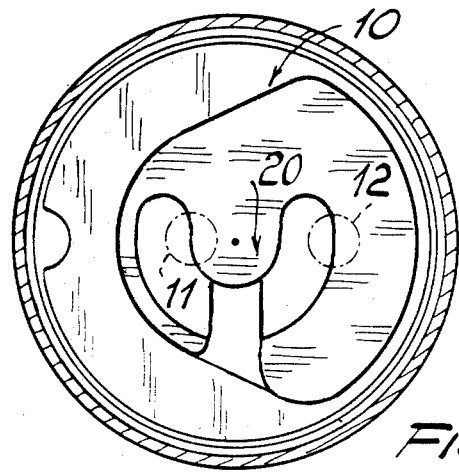
FIG. 3 is a cross section view along the line III—III of FIG. 1 with the shutter disc in a half-open position with mixing of equal amounts of hot water and cold water.
Figure 4:
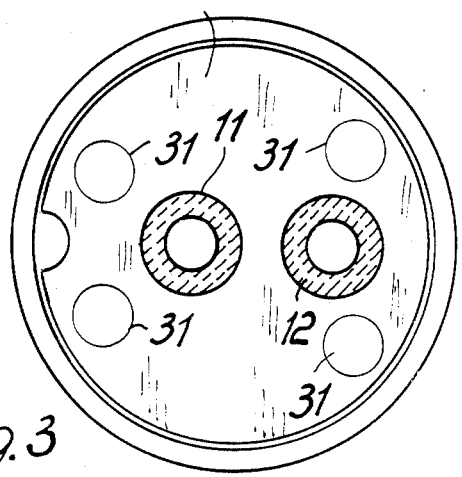
FIG. 4 is a cross section view along the line IV—IV of FIG. 1, illustrating the lower side of the conveyor counterdisc.

The lever 4 is provided with a projection 7 and couples with a recess 8 defined on a movable shutter disc, generally indicated by the reference numeral 10, which at least at its lower surface is preferably made of ceramic. In particular, as can be seen in FIG. 1, and as is well known in the art when lever 4 is rotated about the pivot 5 the shutter disc 10 is shifted laterally and when the lever 4 is rotated about the vertical axis V the shutter disc is rotated about an axis of rotation parallel to said vertical axis V. As can be seen in FIG. 1 the shutter disc 10 is divided into an upper entrainment disc 10' superposed on a lower disc 10", constituting the actual shutter disc, rigidly associated with the entrainment disc 10'.

Two circular porting seats, consisting of a small cylinder 11 and of a small cylinder 12, made of ceramic, act on the shutter disc 10 and are respectively connected to the hot water inlet conduit and to the cold water inlet conduit.

The porting seats 11 and 12 are elastically pushed, in a per se known manner, so as to create a sealing i.e. intercepting contact with the lower face of the movable shutter disc 10 thereby defining a contact plane P.

The movable shutter disc 10 is provided, as illustrated in particular in FIGS. 5 to 10, substantially with the shape of a circular sector with rounded corners. The disc 10 has, in its upper portion, a pin region 15 which is slideably and rotatably guided in a slot 16 defined along a diametral extent by the plate 6.

The disc 10 is provided, on the face directed towards the porting seats 11 and 12, with at least one control port for the seats 11 and 12, generally indicated by the reference numeral 20, which advantageously has the shape of a channel with a development along a portion of circumference extending around the axis of rotation of the disc 10 which is defined by the pin 15 defined by said movable disc, on the other face.

The port 20 is provided, in a middle portion of its development, with a discharge manifold 21 leading into the mixing chamber.

According to what is illustrated in FIGS. 1 to 18, this discharge manifold 21 extends radially and leads into the mixing chamber 2.

According to what is illustrated in FIGS. 19 and 20, a shutter disc 10a is provided, conceptually similar to the preceding one with the difference of being provided with a discharge manifold 21a which extends axially, again leading into the mixing chamber 2, past said entrainment disc 10'.

The important feature of the invention resides in the fact that the port 20, contrary to what is provided in known cartridges, is provided with a cross section which is variable on planes perpendicular to the mating or contacting plane of the seats 11 and 12 with the movable disc i.e. the depth h of the channel defined by the port 20 (FIG. 14) is variable.

In conventional cartridges, e.g. such as disclosed in U.S. Pat. No. 4,205,882 to Bernat instead, the variation of the port, which allows to vary the mixing ratios, develops on the plane of contact between the fixed disc and the movable disc and seats i.e. the width of the channel shaped port is variable, while the depth remains unchanged.

As illustrated in FIGS. 5 to 10, in a selected constant angular position of the lever 4 about the pivot 5, the flow rate being equal, the variation of the mixing temperature is achieved by the rotation of the shutter 10 about the axis of the pin 15 while keeping constant the portion of the cross section of the porting seat which is overlapping the control port, since the control port extends along a circumferential portion having its center in the axis of rotation of the motion which is to be performed to vary the mixing temperature, coinciding with the axis of the pin 15.

In order to vary the mixing ratios of hot water and cold water, the variation of the useful cross section of the control port in the thickness of the disc is used, as illustrated in FIGS. 11 to 16 wherein the "depth" of the channel defined by control port increases from the free end towards the discharge manifold.

Thus, in practice, the useful light or lumen or passage area to be considered for the mutual flow rates of hot water and cold water can be evaluated along vertical planes, since, as visible in FIGS. 15a, 15b and 15c, the cross section is progressively variable owing to the variation of the depth h of the channel 20 from zero, at the end of the circumferential portion of the control port, to a maximum value in the central region where the discharge manifold is provided.

As illustrated in the cross section view of FIG. 16, the variation in the depth can be achieved with a linear behaviour, or possibly, as illustrated in the cross section view of FIG. 18, the depth can vary along curves which can be evaluated case by case so as to achieve a response of the mixing temperature variation according to the angular rotation of the lever 4, which can in any case be calculated beforehand.

It must be added that in order to close the control port 20 at the base, and thus have the water exiting the holes of the seats 11 and 12 flow only towards the discharge manifold, thus obtaining a precise delimitation of the useful flow section, a movable conveyor counterdisc is provided, indicated by the reference numeral 30, which is positioned around the seats 11 and 12 and is elastically pushed by springs 31 against the movable disc 10, the springs 31 acting between the counterdisc 30 and the base block 32 in which the seats 11 and 12 are accommodated.

Figure 5:
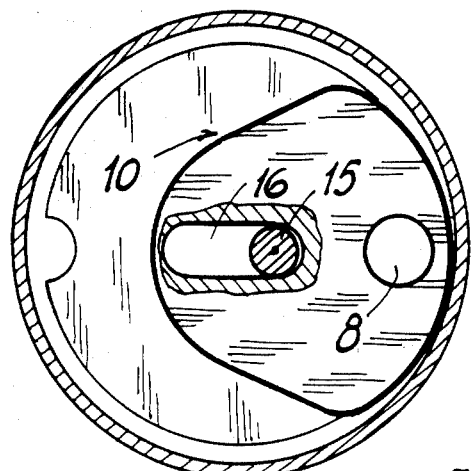
FIG. 5 is a top view of the shutter disc in an open position, arranged for an equal mixing of hot water and cold water in fully open position.
Figure 6:
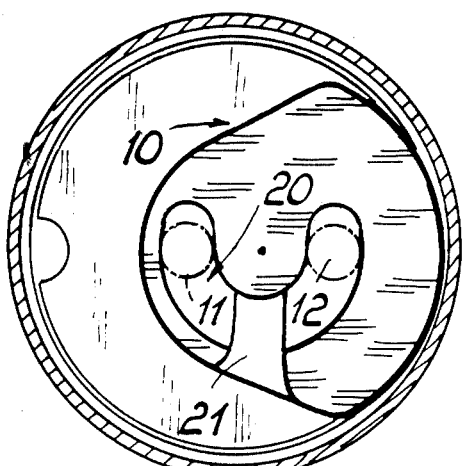
FIG. 6 is a view of the shutter disc in the position of FIG. 5, seen from the lower side to illustrate the control port.
Figure 7:
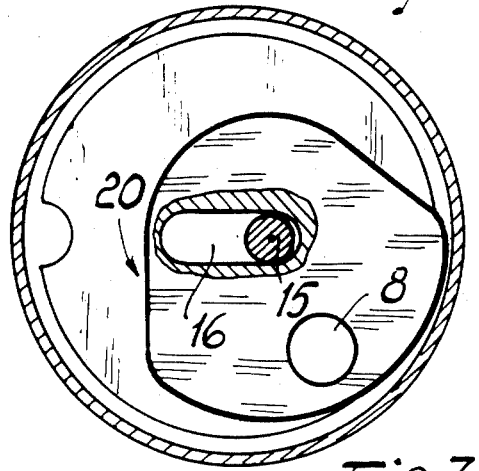
FIG. 7 is a top view of the shutter disc in open position rotated for the dispensing of hot water only.

With specific reference to FIGS. 5 to 6, the tap is open at maximum rate of flow and the movable disc 10 is rotated so as to achieve an equal mixing of hot water and cold water.

It should be furthermore specified that the width of the control port 20 advantageously substantially coincides with the diameter of the holes defined by the seats 11 and 12 i.e. such width is constant over the entire length of the channel-like port 20 as clearly visible in the drawing.

Figure 8:
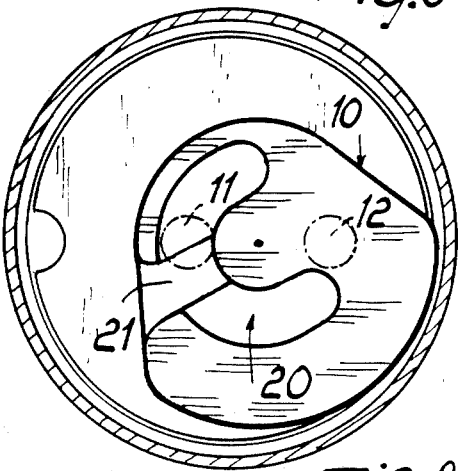
FIG. 8 is a bottom view of the shutter disc in the position of FIG. 7.
Figure 9:
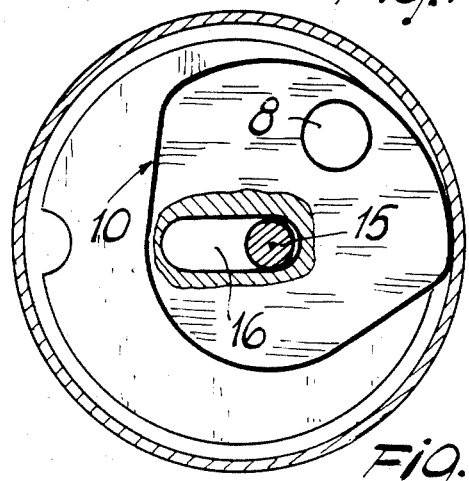
FIG. 9 is a top view of the shutter disc in the fully open position for the dispensing of cold water only.

In order to obtain hot water it is sufficient to rotate the movable disc 10, as illustrated in FIG. 8, so that the movable disc 10 closes the cold water inflow seat 12 and simultaneously opens, with the maximum useful flow section, the hot water.

Figure 10:
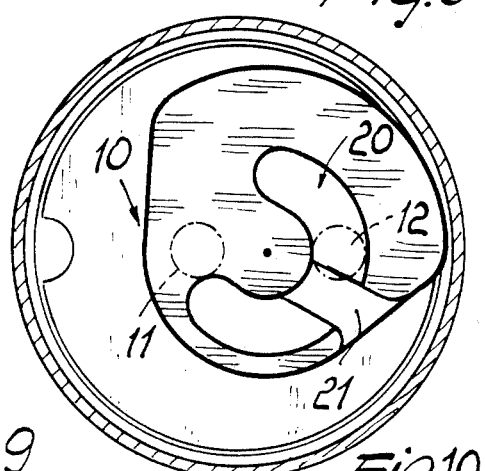
FIG. 10 is a bottom view of the shutter disc in the position of FIG. 9.

The reverse situation occurs in FIG. 10, where the hot water is completely cut-off and the cold water is completely open.

As illustrated in the figures, in the movement to vary the mixing temperature in practice a rotation occurs about the axis defined by the pin 15, which axis in practice coincides with the axis about which the port 20 extends, so that regardless of the angular position assumed by the shutter disc, that is regardless of the mixing temperature, the useful cross-section of the porting seat facing the control port 20 is always the same.

From what has been described it can thus be seen that the invention achieves the aims intended and in particular the fact is stressed that, by using a ceramic movable shutter disc, wherein the control port modifies its cross section in the thickness of the disc, that is to say, on planes perpendicular to the plane of contact between the movable disc and the seats, there is the possibility of obtaining a fine adjustment of the mixing temperature, since there is the possibility of having a perfect proportionality between the angular movement of the operating lever and the mixing of hot water and cold water, independently of the flow rate dispensed.

Another important aspect of the invention resided in the fact that since the sum of the two useful flow sections (hot water and cold water) is equal, the flow rate of the dispensed water remains equal, whatever it may be, for any horizontal angular movement of the operating lever, when the temperature is varied from all cold to all hot (that is, when the operating lever, being in any position of inclination on a vertical plane, rotates about the vertical axis).

A further important aspect of the invention resides in the fact that by varying the dispensed flow rate from zero to maximum or vice versa (that is, by varying the inclination of the operating lever), the temperature of the water dispensed remains constant since equal flow sections respectively uncover or close for each of the two circular seats 11 and 12.

The invention thus conceived is susceptible to numerous modifications and variations, all of which are within the scope of the inventive concept.

Moreover, all the details may be replaced with other technically equivalent elements.

In practice, the materials employed, as well as the dimensions and the contingent shapes, may be any according to requirements.

What is claimed is:

1. A water mixer tap, of the single lever type, comprising a cartridge structure defining a mixing chamber connected to a dispenser outlet, said chamber comprising two porting seats and a movable shutter disc arranged therein, said shutter disc being operable by means of an external lever and cooperating with said two porting seats, said porting seats being connected to a hot water inlet conduit and to a cold water inlet conduit, respectively, said movable shutter disc selectively intercepting said porting seats and defining at least one control port selectively positionable to connect at least one of said porting seats with said mixing chamber, said porting seats defining a contact plane with said movable shutter, said control port being in the shape of a channel with a development along a portion of circumference having its center on the axis of rotation of said movable shutter disc, said control port channel having a depth variable along the development of said channel thereby to vary along the development of said channel the cross-sectional passage area of said channel in the direction transverse to said contact plane and wherein the control port channel has a constant width substantially over the entire length thereof.

2. A mixer tap according to claim 1, wherein said width of said control port channel corresponds to the diameter of the opening of said porting seats.

3. A mixer tap according to claim 1, wherein said control port comprises a discharge manifold provided substantially at a middle point of said portion of circumference, said manifold connecting said control port with said mixing chamber.

4. Mixer tap, according to claim 1, wherein said at least one control port has an increasing cross section, on a plane perpendicular to the plane of contact between said seats and said movable shutter disc, starting from the ends of said at least one control port towards said discharge manifold.

5. Mixer tap, according to claim 3, wherein said discharge manifold extends radially with respect to said movable shutter disc and leads into said mixing chamber.

6. A mixer tap, according to claim 1, wherein said control port comprises a discharge manifold provided substantially at a middle point of said portion of circumference, said manifold connecting said control port with said mixing chamber, and wherein said movable shutter disc is comprised of a lower disc portion and an entrainment disc portion superposed on and rigidly associated to said lower disc portion, said discharge manifold extending axially through said lower disc to connect said mixing chamber with said control port past said entrainment disc portion.

7. Mixer tap, according to claim 1, further comprising a conveyor counterdisc surrounding said porting seats and acting by sealing contact against said movable shutter disc, on the face thereof provided with said at least one control port.

8. Mixer tap, according to claim 7, further comprising a block element supporting said porting seats and spring means on said block element, wherein said conveyor counterdisc is pushed against said movable shutter disc by said spring means acting between said counterdisc and said block element supporting said porting seats.

9. Mixer tap, according to claim 1, wherein for a selected laterally shifted position of said axis of rotation of said shutter disc the portion of said porting seats opening into said at least one control port is constant, the flow rate being equal, as the mixing of hot water and cold water varies upon rotation of said shutter disc about the axis of rotation thereof.

10. Mixer tap, according to claim 1, wherein said at least one control port has a width substantially equal to the diameter of the hole defined by said seats.

11. Mixer tap, according to claim 1, wherein the sum of the uncovered portions of said porting seats opening into said at least one control port is constant as the mixing of hot water and cold water varies upon rotation of said shutter about said axis of rotation thereof.

12. A water mixer tap of the single lever type, comprising a cartridge structure defining a mixing chamber connected to a dispenser outlet, said chamber comprising two porting seats and a movable shutter disc arranged therein for selectively intercepting said porting seats and having an axis of rotation, said shutter disc being operable by means of an external lever for a selective movement in a direction transverse to said axis of rotation and a selective rotatory movement about said axis of rotation, said porting seats being connected to a hot water inlet conduit and to a cold water inlet conduit, respectively, said movable shutter disc defining at least one control port selectively positionable by the movement of said shutter disc to connect at least one of said porting seats with said mixing chamber, said porting seats defining a contact plane with said movable shutter, said control port being in the shape of a channel with a development along a portion of a circumference having a center thereof on the axis of rotation of said movable shutter disc, said control port channel having a depth variable along the development of said channel, thereby to vary along the development of said channel the cross-sectional passage area of said channel in the direction transverse to said contact plane, the device further comprising a conveyor counter disc surrounding said porting seats and acting by sealing contact against said movable shutter disc, on the face thereof provided with said at least one control port, a block element supporting said porting seats and spring means on said block element and wherein said conveyor counterdisc is pushed against said movable shutter disc by said spring means acting between said counterdisc and said block element supporting said porting seats.

13. A tap according to claim 12, wherein in combination said control port channel has a constant width.

* * * * *